March 15, 1960 C. VAN DER LELY ET AL 2,928,480
IMPLEMENT FOR WORKING THE GROUND
Filed Aug. 9, 1955 5 Sheets-Sheet 1

United States Patent Office 2,928,480
Patented Mar. 15, 1960

2,928,480

IMPLEMENT FOR WORKING THE GROUND

Cornelis van der Lely and Ary van der Lely, Maasland, Netherlands; said Ary van der Lely assignor to said Cornelis van der Lely Application August 9, 1955, Serial No. 527,384

Claims priority, application Netherlands August 13, 1954

1 Claim. (Cl. 172—56)

This invention relates to implements for working the ground.

More particularly, the invention is concerned with the type of implement which functions by displacing ground from adjacent strips, and it is an object of the invention to provide improved devices of this type.

A further object of the invention is to provide an improved ground working device which is readily adaptable to various types of operation and to the circumstances and character of the ground to be worked.

Still another object of the invention is to provide an improved implement adapted for being moved by means of tractive forces; and in this regard, it is a particular object of the invention to provide an improved ground working device which can be operated without great magnitudes of tractive forces.

In accordance with one embodiment of the invention, there is provided an implement for working the ground and which is drawn by a tractor. The implement comprises first arms rigidly fixed to the tractor and second arms pivotally connected to the first arms. A first axle is supported by the second arms transversely of the longitudinal axis of the tractor. A power take-off couples the tractor to this first axle for driving the latter.

In further accordance with the invention, at least two trailing axles are coupled to the first axle, each including at least one universal coupling device to provide for adjustment relative to the first axle. Transmission devices couple the trailing axles to the first axle, one of the trailing axles being longer than the other.

Frame members are coupled to and extend rearwardly of the tractor. A ground working member is coupled to each of the trailing axles. The ground working members are coupled to the frame members in an adjustable manner.

Each of the ground working members comprises an axle and ground displacing members aligned on these axles. Further included in each ground working member is a casing housing the ground displacing members and defining a volume in excess of the volume required by the ground displacing members.

Figure 1:
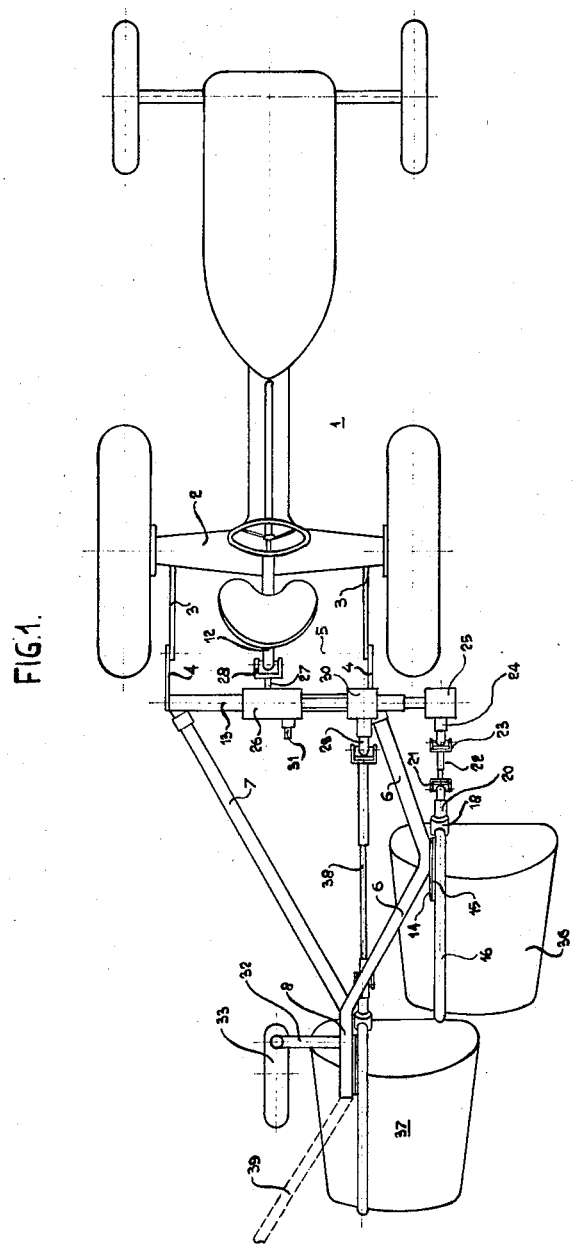
Figure 2:
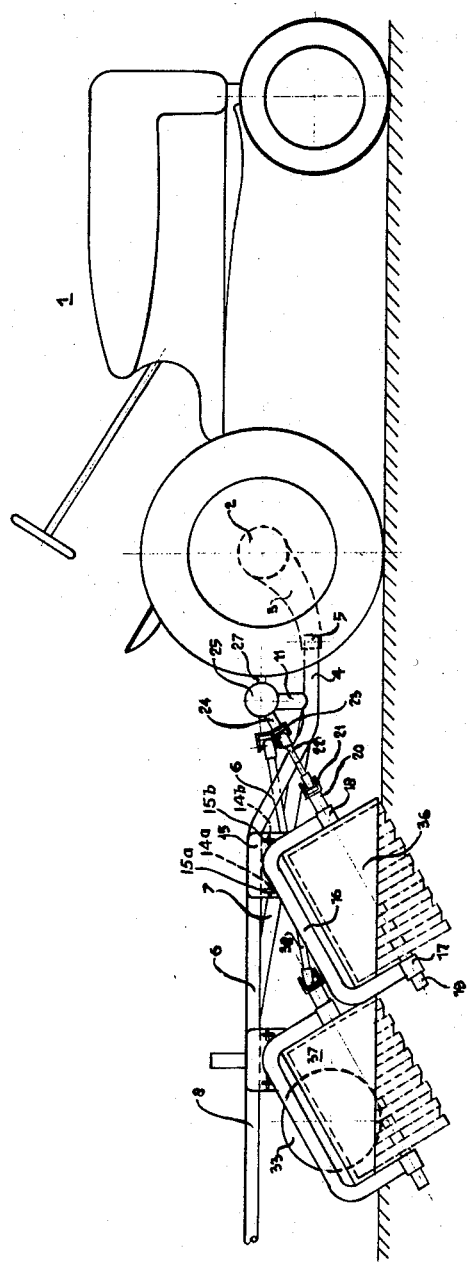
Figure 3:
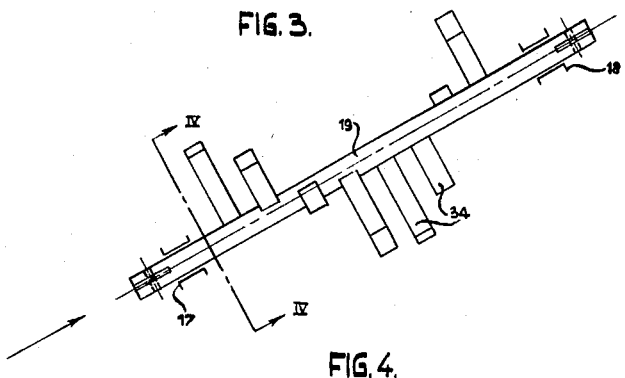
Figure 4:
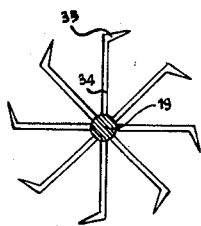
Figure 5:
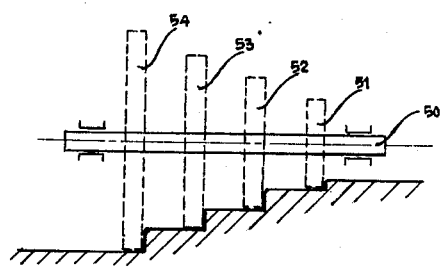
Figure 6:
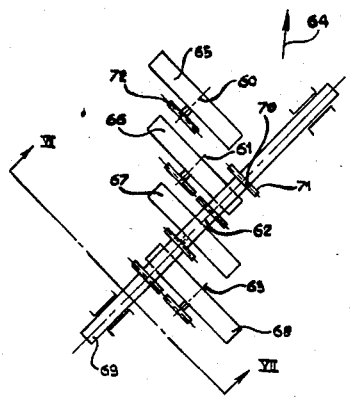
Figure 7:
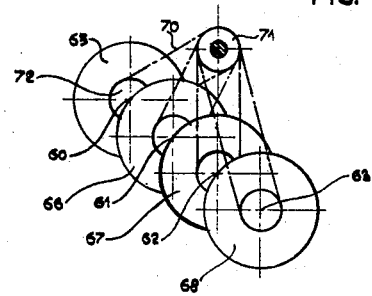
Figure 8:
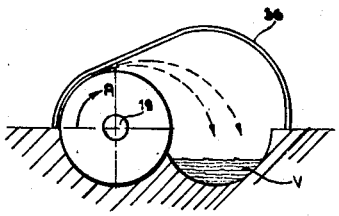
Figure 9:
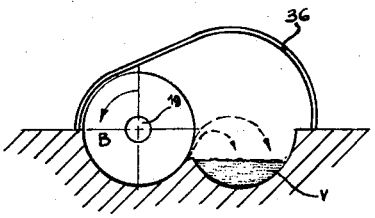
Figure 10:
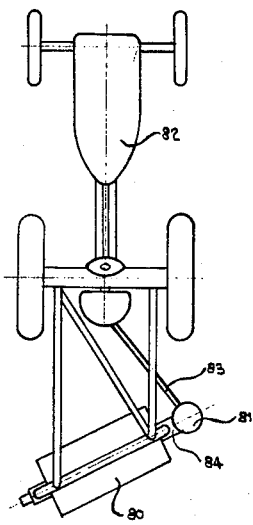
Figures 11, 13:
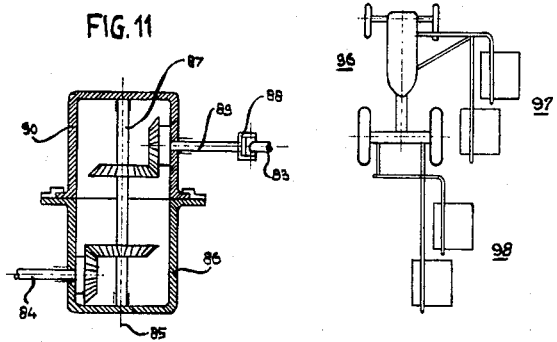
Figure 12:
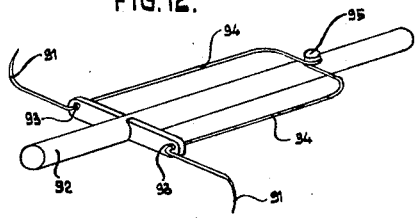

Advantages and features of the invention, as well as further objects thereof, will be found in the following detailed description as illustrated in the accompanying drawing, in which:

Fig. 1 is a plan view of an implement according to the invention operatively associated with a tractor and provided with two ground working devices, Fig. 2 is a side elevational view of the same implement, Fig. 3 is a side elevational view of a part of a ground working device used in the implement of Figs. 1 and 2, Fig. 4 is a sectional view along line IV—IV in Fig. 3, Fig. 5 is a side elevational view of a variation of a part of the ground working device, Fig. 6 is a diagrammatical plan view of a third embodiment of the ground working device, Fig. 7 is a sectional view along line VII—VII in Fig. 6, Figs. 8 and 9 represent sections through ground working devices which are provided with covers, Fig. 10 shows an implement according to the invention in a position in which it can be used to perform a different function, Fig. 11 is a sectional view through a part of the implement according to Fig. 10, Fig. 12 shows ground working members which can be used instead of those which are shown in Figs. 3 and 4, Fig. 13 shows a tractor provided with two implements according to the invention.

According to Figs. 1 and 2, an implement according to the invention is fastened behind a tractor 1. The rear axle 2 of said tractor carries arms 3 to which arms 4 of the implement are connected in such a way that it can pivot about a horizontal axis 5. The arms 4 constitute extensions of two bars 6 and 7 of the frame of the implement, which bars converge at the rear in a bar 8 extending backwards. Where the arms 4 merge into the bars 6 and 7, they are connected to a connecting member 13 of the implement by means of short columns 11, said connecting member 13 being located on the same level as the power take off 12 of the tractor, due to which the frame will resist torsional deformation.

The bar 6 is bent sharply near its middle and carries a vertical plate 14. A plate 15 is attached to plate 14 in such a way that it can be fixed at various heights and also moved forward or backwards as well as tilting in various planes. For this purpose, the plate 14 may be provided with two horizontal slots 14a and 14b and the plate 15 with two vertical slots 15a and 15b, the slots accommodating bolts by which the plates are pulled rigidly against one another. A yoke 16 is fastened to the plate 15 and is situated in a vertical plane, the arms of said yoke 16 carrying axle bearings 17 and 18 for a shaft 19. Said shaft projects behind the bearing 17 and ahead of the bearing 18. At the foremost extremity of shaft 19, a box 20 is fixed which carries a universal joint 21. This joint is connected via a telescopic and extensible driving shaft 22 and a second universal joint 23 to an axle 24. This axle is driven by conical toothed wheels enclosed in a casing 25, by means of a shaft extending in the longitudinal direction of the connecting member and located inside the connecting member. Said shaft is driven via conical toothed wheels in the casing 26 by means of a shaft 27 which is coupled via a universal joint 28 to the telescopic and extensible shaft 12, while the same shaft in addition to the axle 24 also drives an axle 29 by conical toothed wheels in a casing 30 and an axle 31 by conical toothed wheels in the casing 26. The axles 24, 29 and 31 rotate with the same velocity.

The bar 8 of the frame carries an arm 32 to which a self-adjusting running wheel 33 is coupled, the height of the frame on the wheel being adjustable. The position of the frame is defined by said running wheel 33 and the axis 5.

Blades 34 with chisel-shaped free extremities 35 are placed on the shaft 19 as is shown by Figs. 3 and 4. Said blades are arranged helically in order to obtain a constant load and a regular action; they are arranged only on the part of the shaft located between the bearings 17 and 18. The blades themselves are not shown in Fig. 2, the dotted lines indicating the spaces covered by said blades. The axle ends projecting outside of the bearings 17 and 18 are provided in exactly the same way, so that the universal joint 21 might also fit to the rear extremity. A casing 36 is fastened to the yoke 16, the lower edge of said casing being in a horizontal plane located only a little above the ground. The casing is such that the blades 34 can just freely rotate and comprises at its right side an empty space having about the same size as the space in which the blades move.

Each of the blades 34 constitute a ground working member and the combination of the blades with the shaft 19, the bearings 17, 18 and the casing 36 constitutes a ground working device. To the bar 8 of the frame, a second ground working device 37 is attached which is the same as the first-mentioned one and is fastened in the same way. This member is driven via a telescopic and extendible shaft 38 provided with universal joints at both its extremities, said shaft 38 being driven by the axle 29. Bar 8 can be extended with a bar 39 to which still a third ground working device might be fastened.

The employment and the working of the implement is as follows. In order to move the tractor with the implement out of operation, the running wheel 33 is adjusted to such a height that both ground working devices are entirely free from the ground. Assuming an open furrow exists in the field to be worked, the tractor with its ground working devices free from the ground is placed in such a way that it stands on the unworked ground with the right part of the casing 36 above the furrow.

The power take-off 12 is driven by the tractor motor and then the running wheel is adjusted so that the ground working members displace the ground after which the position shown in Fig. 2 is reached. The implement is used in said position such that the foremost ground working member on shaft 19 removes the uppermost layer from the strip of ground beside the furrow and throws this layer to the zone which is left free by the casing 36. The next ground working member on shaft 19 takes a following ground layer away from the strip beside the furrow. This ground too is dropped into the furrow on top of the ground already thrown into the same. Continuing in this way, the last ground working member on shaft 19 throws the deepest ground layer from the strip on top of the ground previously dropped into the furrow, so that the latter furrow is entirely filled and a new furrow is formed. The ground from the new furrow lies inverted in the first furrow. The ground working device 37 fills the second furrow forms a further furrow lying more to the left.

The depth which is worked can be controlled by adjusting the frame with regard to the running wheel 33. Nevertheless, if it is necessary to work at a certain depth for a long time, it is preferable to adjust the plate 15 in such a way with regard to the plate 14 that the foremost ground working member works only the upper layer of the ground and the hindmost ground working member works at the required depth.

The driving shaft 22 and the couplings 21 and 23 allow driving in any desired position. The device 37 should be adjusted in the same way as the preceding device.

According to Fig. 5, the blades forming the ground working members may also have an unequal length. The shaft 50 is provided with four blades the length of which increases from the front of the shaft 50 to the rear. The cylindrical spaces covered by said blades are denoted in the figure by 51–54. The blades deepen the furrow which they constitute, gradually as in the case of the device according to Fig. 3; if desired, however, the shaft 50 may be horizontal. Of course, spaces 51–54 can include more than one blade. The great length of the hindmost blades facilitates the transport of the ground to the adjacent furrow.

Figs. 6 and 7 show still a different arrangement of the blades according to the invention. Four axles 60–63 are arranged behind one another at an acute angle to the travelling direction 64, but those arranged nearer the rear are situated at lower levels. Blades are rotatable about the axles, said blades defining the cylindric spaces 65–68, respectively. The blades are driven from a shaft 69 by means of a chain 70, which engages a sprocket wheel 71 fixed to the shaft 69 and a sprocket wheel 72 fixed to the blades, the remaining blades being driven in a similar way.

The driving of the blades occurs in such a way that they move obliquely backwards when in their lowermost positions. The advantage of the arrangement is that the resistance which the blades meet while scraping a layer of ground away has a forwardly directed component by which the tractive force required for the whole implement is very small. As the hindmost blades are situated at the lowest level, a sufficient turning of the ground removed from a strip and dropped into an adjacent furrow is obtained.

The driving of the blades may occur in one as well as in the other direction of rotation in the cases of Figs. 3–5, provided that the chisels 35 are always directed forward the travelling direction. When it is desired to drive the shaft 19 of the device shown in Figs. 3 and 4 in transverse direction, it is not necessary to turn each blade separately, as the whole shaft can be reversed. In Figs. 8 and 9, the working of a blade fixed to the shaft 19 and located inside the casing 36 is shown diagrammatically for the direction of rotation of Fig. 4 (represented by the arrow A) and the opposite direction of rotation (represented by the arrow B), respectively. As the furrow V is the only zone where the worked ground can be accommodated, the dirt will collect in this furrow.

It is possible to make an implement according to the invention suitable for working the ground without effecting a turning of the ground, in which case the working may be less deep, so that a large surface can be worked quickly. According to Figs. 10 and 11, a ground working device 80 is provided for that purpose with a special coupling 81 by which the device 80 can be fixed in an oblique position behind the tractor 82. The power take-off 83 makes such an angle with the shaft 84 to which the ground working members are fixed that a coupling which can also be used in other positions, is not very simple. The special coupling 81 comprises a casing composed of two parts which are rotatable with regard to each other about a substantially vertical center line 85, the lowermost part 86 of said casing being rigidly connected to the ground working device. The shaft 84 extends to said casing and is coupled via conical toothed wheels to a shaft 87 the center line of which is also the line 85. The power take-off 83 is coupled via a universal joint 88 to a short axle 89 supported in the wall of the uppermost part 90 of the casing and coupled via conical toothed wheels to the shaft 87. Consequently, the axle 89 can be given any desired direction in a plane without difficulty.

As described hereinbefore, the ground working members may be blades, but they also may have a different shape. An embodiment suitable for certain kinds of soil is composed of a steel hook 91 (Fig. 12) having a center of rotation 93 at a distance from the driven shaft 92. Preferably, the hook is kept elastically in a position by leading an extension 94 of the steel wire, from which the hook is formed, parallel to the shaft 92 and by securing its extremity to the shaft 92 by means of a fastening member 95. It will be advantageous to form two hooks 91 from a single piece of steel wire. The required resiliency is provided by means of the parts 94.

As is shown by Fig. 13, it is possible to cause a tractor 96 to move a number of implements, such as the implements 97 and 98, at the same time, in which case the foremost implement 97 may be beside the tractor and the hindmost implement 98 behind the tractor. The foremost ground working device of the hindmost implement fills the furrow left vacant by the foremost implement.

What we claim is:

An implement for working the ground and for being drawn by a tractor comprising first arms rigidly fixed to said tractor, second arms pivotally connected to said first arms and having a common axis of rotation, a first axle supported by said second arms transversely of the longitudinal axis of the tractor, a power take-off coupling said tractor to said first axle for driving the latter, at least two trailing axles adapted for being coupled to said first axle and each including at least one universal coupling device to provide for displacements relative to said first axle, transmission devices coupling said trailing axles to said first axle at laterally spaced positions thereupon, one of said trailing axles being longer than the other of said trailing axles, frame members coupled to and extending rearwardly of said tractor, a ground working member coupled to each of the trailing axles, and means coupling each ground working member to a frame member for adjusting the relative positions therebetween; each ground working member comprising an axle, ground displacing members aligned on the latter said axle, and a casing housing the ground displacing members and defining a volume in excess of the volume necessary for these members for the guidance of dislodged ground.

References Cited in the file of this patent

UNITED STATES PATENTS

| | | |
|---|---|---|
| 1,106,541 | Bruce | Aug. 11, 1914 |
| 1,365,192 | Petit | Jan. 11, 1921 |
| 1,699,552 | Turner et al. | Jan. 22, 1929 |
| 1,729,073 | Johnston | Sept. 24, 1929 |
| 1,733,153 | Hagglund | Oct. 29, 1929 |
| 2,516,794 | Neel | July 25, 1950 |